United States Patent [19]
Kropp et al.

[11] Patent Number: 5,879,420
[45] Date of Patent: Mar. 9, 1999

[54] REACTION PRODUCTS OF POLYISOBUTENES AND OXIDES OF NITROGEN OR MIXTURES OF OXIDES OF NITROGEN AND OXYGEN AND THEIR USE AS FUEL AND LUBRICANT ADDITIVES

[75] Inventors: Rudolf Kropp, Limburgerhof; Eckhard Hickmann, Dannstadt-Schauernheim; Klaus Ebel, Lamperthelm; Wolfgang Günther, Mettenheim; Hans Peter Rath, Grünstadt; Harald Schwahn, Wiesloch, all of Germany

[73] Assignee: BASF Aktiengesellschaft, Ludwigshafen, Germany

[21] Appl. No.: 765,821
[22] PCT Filed: Jul. 18, 1995
[86] PCT No.: PCT/EP95/02804
§ 371 Date: Jan. 21, 1997
§ 102(e) Date: Jan. 21, 1997
[87] PCT Pub. No.: WO96/03367
PCT Pub. Date: Feb. 8, 1996

[30] Foreign Application Priority Data

Jul. 21, 1994 [DE] Germany .......................... 44 25 834.8

[51] Int. Cl.$^6$ .............. C10L 1/18; C10L 1/22; C07C 205/00
[52] U.S. Cl. .............. 44/412; 44/413; 568/943; 568/944; 564/495; 564/503
[58] Field of Search .................. 44/413, 412; 568/943, 568/944; 564/495, 503

[56] References Cited

U.S. PATENT DOCUMENTS

| | | | |
|---|---|---|---|
| 2,478,243 | 8/1949 | Coe et al. | 568/943 |
| 2,811,560 | 10/1957 | McKinnis | 568/704 |
| 3,328,463 | 6/1967 | Lee | 44/434 |
| 3,510,531 | 5/1970 | Larkin et al. | 568/943 |
| 3,576,742 | 4/1971 | Honnen et al. | 508/291 |
| 3,681,463 | 8/1972 | Lee | 44/434 |

FOREIGN PATENT DOCUMENTS

| | | |
|---|---|---|
| 2687159 | 8/1993 | France . |
| 1443380 | 10/1968 | Germany . |
| 2702604 | 7/1978 | Germany . |
| 1010410 | 11/1965 | United Kingdom . |

*Primary Examiner*—Jacqueline V. Howard
*Attorney, Agent, or Firm*—Oblon, Spivak, McClelland, Maier & Neustadt, P.C.

[57] ABSTRACT

Reaction products of polyisobutenes having an average degree of polymerization P of from 10 to 100 and a content E of from 60 to 90% of double bonds which can react with maleic anhydride, E=100% corresponding to the theoretical value for the case where each molecule of the polyisobutene has such a reactive double bond, with oxides of nitrogen or mixtures of oxides of nitrogen and oxygen, are suitable as additives for fuels, in particular for gasoline engines, and for lubricants.

14 Claims, No Drawings

REACTION PRODUCTS OF POLYISOBUTENES AND OXIDES OF NITROGEN OR MIXTURES OF OXIDES OF NITROGEN AND OXYGEN AND THEIR USE AS FUEL AND LUBRICANT ADDITIVES

BACKGROUND OF THE INVENTION

1. Field of the Invention

The present invention relates to reaction products of polyisobutenes having an average degree of polymerization P of from 10 to 100 and a content E of from 60 to 90% of double bonds which can be reacted with maleic anhydride, where E=100% would correspond to the theoretical value for the case where each molecule of the polyisobutene has such a reactive double bond, with oxides of nitrogen or mixtures of oxides of nitrogen and oxygen.

The present invention furthermore relates to the use of these reaction products as fuel and lubricant additives and to gasoline engine fuels and lubricants containing these reaction products.

2. Discussion of the Background

The carburetor and intake system of gasoline engines, as well as injection systems for metering fuel into gasoline and diesel engines, are contaminated with impurities which are caused by dust particles from the air, uncombusted hydrocarbon residues from the combustion space and the crankcase vent gases passed into the carburetor.

The residues shift the air/fuel ratio in the idling state and in the lower part-load range so that the mixture becomes richer and the combustion more incomplete and in turn the proportions of uncombusted or partially combusted hydrocarbons in the exhaust gas increase and the gasoline consumption rises.

It is known that these disadvantages can be avoided by using fuel additives for keeping valves and carburetor or injection systems clean (M. Rossenbeck in Katalysatoren, Tenside, Mineralöladditive, Editors J. Falbe and U. Hasserodt, page 223 et seq., G. Thieme Verlag, Stuttgart, 1978).

Depending on the mode of action, but also on the preferred place of action of such detergent additives, a distinction is now made between two generations of such assistants.

The first generation of additives could prevent only the formation of deposits in the intake system but could not remove existing deposits, whereas the additives of the second generation can accomplish both (keep-clean and clean-up effect) and can do so because of their excellent heat stability, in particular in zones at relatively high temperatures, ie. in the intake valves.

In general terms, the molecular structural principle of fuel detergents can be expressed as the linking of polar structures with generally relatively high molecular weight, nonpolar or lipophilic radicals.

Typical members of the second generation of additives are often products based on polyisobutenes in the nonpolar moiety. Among these in turn, additives of the polyisobutylamine type are particularly noteworthy.

U.S. Pat. No. 3,576,742 (1), filed in 1968 and granted in 1971, describes reaction products of branched long-chain aliphatic olefins, for example polypropylene, polyisobutylene or copolymers of ethylene and isobutylene, and oxides of nitrogen as detergents for lubricants. These olefins are prepared from lower olefins of 2 to 6 carbon atoms by conventional polymerization methods. In the resulting nitro-containing reaction products, the presence of further functional groups, such as hydroxyl, nitroso, nitrate, nitrite or carbonyl, and the relative proportions thereof are unknown. The structure and composition of these olefins are thus undefined.

DE-C 27 02 604 (2) published in 1978 describes a preparation process for polyisobutenes having an average degree of polymerization of from 10 to 100, by means of which highly reactive polyisobutenes, ie. those having predominantly terminal double bonds, were obtained for the first time. On the other hand, the polyisobutenes prepared by conventional polymerization methods, as in (1), have only a low content of terminal double bonds.

The nitro-containing reaction products disclosed in (1) and based on conventional polyisobutene do have a certain action as lubricant additives, but this action is still unsatisfactory. Furthermore, it is said that the compositions can also be used as additives for fuels for gasoline engines.

SUMMARY OF THE INVENTION

It is an object of the present invention to provide fuel and lubricant additives having an improved action.

Starting from a polyolefin, it is intended in particular to prepare, in a simple, one-stage reaction, a polyolefin derivative which can be used as a fuel and lubricant additive and has a defined structure and composition, mainly for reasons of controllability and reproducibility.

We have found that this object is achieved by reaction products of highly reactive polyisobutenes and oxides of nitrogen or mixtures of oxides of nitrogen and oxygen, said reaction product being defined at the outset.

DETAILED DESCRIPTION OF THE PREFERRED EMBODIMENTS

It was surprising that the stated reaction of the polyisobutenes described gives a product which has excellent properties as a fuel and lubricant additive although the product contains no basic N group. An advantage over the conventional two-stage processes for the preparation of (amine-containing) fuel additives based on polyolefins is the simple, one-stage preparation method. Moreover, it was surprising that the polyolefin reacts completely and gives a reaction mixture whose main components can be exactly defined in their chemical structure and in their ratio.

(2) discloses that the highly reactive polyisobutenes described, which serve as starting material for the present invention, can be prepared by means of boron trifluoride under special reaction conditions. These highly reactive polyisobutenes are generally important intermediates for mineral oil assistants. If these polyisobutenes (it would be more appropriate to refer to them as oligoisobutenes, but this term is less common in the literature) are reacted with maleic anhydride, addition compounds form, from which high-quality lubricating oil additives are obtained by reaction with amines.

However, this addition reaction takes place virtually only between the maleic anhydride and a terminal ($\alpha$) double bond in the polyisobutene, which double bond originates from the chain termination. $\beta$ double bonds are also capable of reacting with maleic anhydride to a certain extent, whereas virtually no reaction takes place with internal double bonds. If the content of the reactive, predominantly terminal double bonds in the polyisobutene is denoted by E, the relative efficiency W of the lubricating oil additive would be 100% if all theoretically possible double bonds were terminal, ie. E would also be 100%. However, this is not the case in practice, where conventional polyisobutenes generally give only values of E=W=from 20 to 50%. Accordingly, the amounts of such a polyisobutene/maleic anhydride reaction mixture which are used must be larger than would be theoretically required for E=100%. The polyisobutene which is present in the composition and has not reacted with the maleic anhydride is at best inert in the mineral oil assistant; it is even necessary to remove larger amounts.

The average degree of polymerization P is from 10 to 100, preferably from 15 to 40. As is always the case in such polymerizations, polymers having a certain range of degrees of polymerization are obtained. With regard to the properties of the novel reaction products with oxides of nitrogen or mixtures of oxides of nitrogen and oxygen, the scatter has no detectable effect and all that is important is therefore the average degree of polymerization P which, for example, can be continuously determined and controlled by viscosity measurements, even during the polymerization.

In correlation with the average degree of polymerization P, the highly reactive polyisobutenes described are of 36 to 400, preferably 54 to 160, carbon atoms and have number average molecular weights of from 500 to 5600, preferably from 750 to 2250.

As starting materials for the present invention, the term polyisobutenes is to be understood as meaning not only the homopolymers of isobutene, but also its copolymers containing at least 80% of isobutene suitable comonomers are primarily the other olefinically unsaturated $C_4$ hydrocarbons, so that it is possible to start directly from the $C_4$ cuts, which is of particular industrial importance. These cuts contain only from 35 to 45% of isobutene in addition to from 12 to 14% of butanes, from 40 to 55% of butenes and up to 1% of butadiene, but the substantially selective polymerizability of the isobutene means that the other monomers are incorporated in the polymer only in an amount of from about 2 to 20% under the polymerization conditions. The monomers which have not reacted can be used for other purposes. Suitable further comonomers are also $C_3$ monomers, such as propene, and ethylene or a mixture thereof or with $C_4$ monomers.

This process gives isobutenes having a content E of double bonds which can be reacted with maleic anhydride of from 60 to 90 percent and in many cases from 75 to 90 percent. Accordingly, the theoretical value of E=100% would mean that each polyisobutene molecule contains such a reactive double bond. E can be determined in a simple manner and most reliably directly from the acid number of the polyisobutene/maleic anhydride adduct.

Suitable oxides of nitrogen for the reaction to give the novel products are in particular nitric oxide (NO), nitrogen dioxide ($NO_2$), dinitrogen trioxide ($N_2O_3$), dinitrogen tetroxide ($N_2O_4$), mixtures of these oxides of nitrogen with one another and mixtures of these oxides of nitrogen with oxygen, in particular NO with oxygen and $NO_2$ with oxygen. Where oxygen is concomitantly used, it accounts for from 1 to 70, in particular from 5 to 50, % by volume in the mixture with the oxides of nitrogen. The mixture of oxides of nitrogen and oxygen may also contain inert gases, eg. nitrogen; this is the case, for example, when mixtures of oxides of nitrogen and air are used.

The reaction to give the novel products can be carried out at atmospheric or superatmospheric pressure, batchwise or continuously.

In order to obtain a quantitative conversion, the oxides of nitrogen are added in a molar ratio of polyisobutenes to oxides of nitrogen of from 1:2 to 1:4, preferably from 1:2.2 to 1:3.3. A larger excess has no adverse effect.

The temperature is not critical. It may be varied from −30° to 150° C. and is preferably from −10° to 100° C., in particular from 25° to 80° C.

The reaction is advantageously carried out in an inert organic solvent. For example, aliphatic hydrocarbons, such as isooctane or an n-alkane mixture (for example $C_{10}$–$C_{13}$), chlorinated hydrocarbons, such as methylene chloride, carbon tetrachloride or chlorobenzene, ethers, such as diethyl ether, tetrahydrofuran, dioxane or tert-butyl methyl ether, esters, such as ethyl acetate or methyl benzoate, amides, such as dimethylformamide or N-methylpyrrolidone, and acids, such an acetic acid, are suitable for this purpose. If the reaction products are to be used as fuel additives, it is advantageous to use the solvent in which they are also added to the fuel. In general, the amounts of solvent are from 50 to 90% by weight of the total batch. However, solvents may also be dispensed with.

The addition of a small amount of water (from about 0.2 to 1% by weight, based on polyisobutene used) to hydrolyze any nitrite ester formed has no adverse effect.

A reaction batch is generally worked up by either heating briefly to 40°–50° C. under reduced pressure or stirring with water and then carrying out phase separation. The aim of both measures is to remove residues of oxides of nitrogen from the reaction mixture.

As a rule, particularly when $NO_2$ was used or concomitantly used as the oxide of nitrogen, the novel reaction product is obtained in the form of a mixture of different nitro-containing alkanes, this mixture containing, as main components, the compounds of the formulae I and II

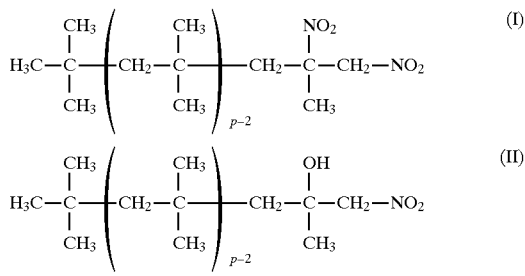

having the abovementioned degree of polymerization P.

Compounds of the formulae III and IV are often found as further defined components:

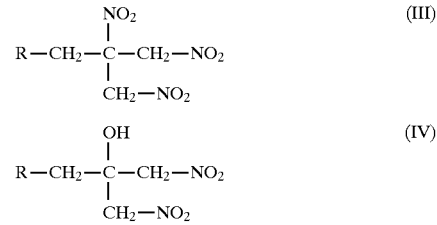

where R here and below is to be understood an abbreviation for polyisobutyl radicals

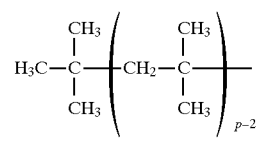

Depending on the oxides of nitrogen or mixtures of oxides of nitrogen and oxygen used, the following compounds V to VIII can be detected as byproducts in some cases:

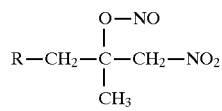  (V)

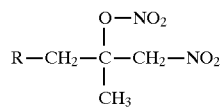  (VI)

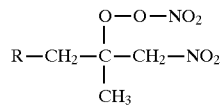  (VII)

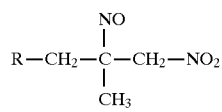  (VIII)

The compounds I to IV form the esesential components of the novel reaction product. This mixture of the compounds I to IV usually contains from 50 to 90, in particular from 60 to 85, % by weight of the novel reaction product. The remainder is formed essentially by the compounds V to VIII and the structures IX to XVI which are similar to the compounds I to VIII and are based on the polyisobutenes which have a β double bond and are also present in small amounts in the polyisobutenes described:

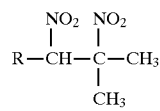  (IX)

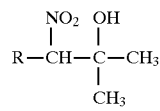  (X)

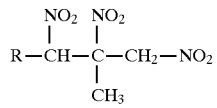  (XI)

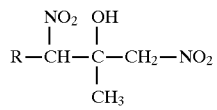  (XII)

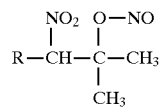  (XIII)

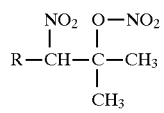  (XIV)

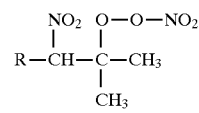  (XV)

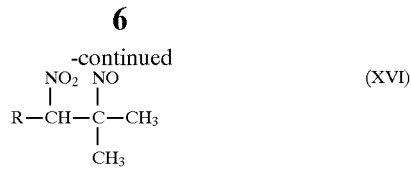  (XVI)

As a rule, the compounds I to IV are present in the following ratio:

I from 25 to 70, in particular from 35 to 60, % by weight;
II from 3 to 30, in particular from 5 to 25, % by weight;
III from 0 to 30, in particular from 5 to 25, % by weight;
IV from 0 to 25, in particular from 2 to 15, % by weight;

where the percentages are based on the amount of the compounds I to IV (total 100% by weight).

If, as stated above, the polyisobutenes used also contain polymer-forming units other than isobutene, R in the structures III to XVI and similarly also the molecular moiety corresponding to R in the formulae I and II have a corresponding meaning.

The present invention also relates to reaction products of the highly reactive polyisobutenes described and oxides of nitrogen or mixtures of oxides of nitrogen and oxygen, which have been converted into nitro-containing alkenes after their formation by elimination with bases.

Suitable structures for such secondary products are in particular the compounds XVII and XVIII

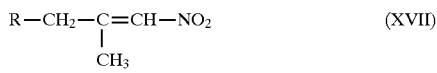  (XVII)

  (XVIII)

XVII originally being formed from a polyisobutene having a terminal double bond and XVIII originally being formed from a polyisobutene having a β double bond. The hydroxyl-containing compounds II, IV, X and XII may also be byproducts of such subsequent elimination reactions. As a rule, the product of the elimination reaction is a mixture of different species, in which XVII forms the main component and XVIII occurs only in small amounts, if at all.

Such elimination reactions are carried out under the conventional conditions. The bases used are, for example, alkali metal hydroxides, such as NaOH or KOH, alkali metal alcoholates, such as sodium methylate, sodium ethylate, sodium isopropylate or potassium tert-butylate, or in particular alkali metal carbonates or bicarbonates, such as sodium carbonate, potassium carbonate, sodium bicarbonate or potassium bicarbonate.

The nitro-containing alkenes thus obtained are suitable as intermediates for the preparation of corresponding polyisobuteneamines effective as fuel and lubricant additives or are themselves effective fuel and lubricant additives.

Owing to their properties, the novel reaction products of polyisobutenes and oxides of nitrogen or mixtures of oxides of nitrogen and oxygen are used as detergents and dispersants in fuels, in particular in fuels for gasoline engines. However, they may also be used as additives in lubricants.

If the novel reaction products which are nitroalkanes are hydrogenated by conventional methods to give corresponding aminoalkanes, compounds which are effective as fuel and lubricant additives are also obtained. Such aminoalkanes mainly have the following structures XIX to XXVI:

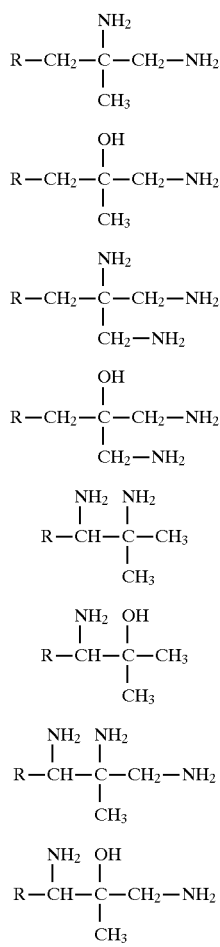

(XIX)
(XX)
(XXI)
(XXII)
(XXIII)
(XXIV)
(XXV)
(XXVI)

Corresponding aminoalkanes of the structures XXVII and XXVIII can also be prepared from the secondary products XVII and XXVIII:

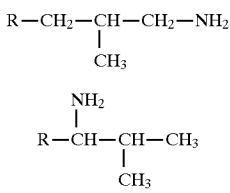

(XXVII)
(XXVIII)

The following structures XXIX to XXXIV are also obtainable by suitable functionalization of the double bond in XVII or XVIII, such as an addition reaction of amines $HNR^1R^2$ or alcohols $R^1$—OH or cleavage to aldehydes and an addition reaction of amines $HNR^1R^2$ with these aldehydes and subsequent hydrogenation:

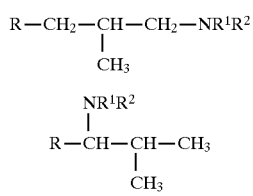

(XXIX)
(XXX)

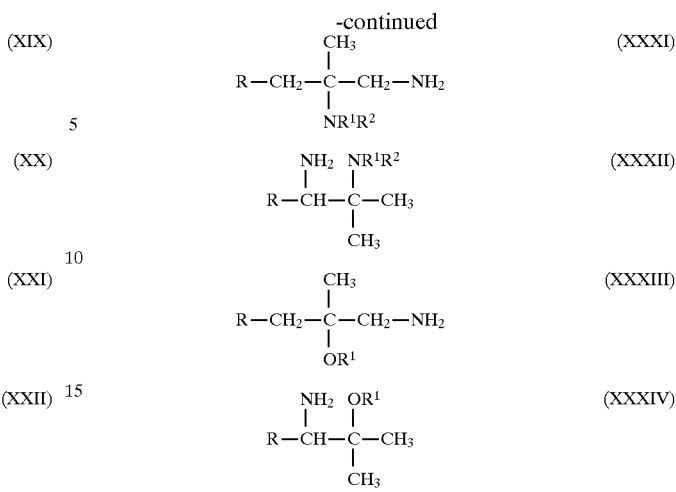

(XXXI)
(XXXII)
(XXXIII)
(XXXIV)

Here, $R^1$ and $R^2$ are in general organic radicals, and $R^2$ may furthermore be hydrogen. $C_1$–$C_{30}$-alkyl, $C_2$–$C_{30}$-alkenyl, $C_5$–$C_8$-cycloalkyl, $C_7$–$C_{18}$-aralkyl and unsubstituted or substituted $C_6$–$C_{14}$-aryl are meant in particular here.

If the novel reaction products are used in fuels, they are preferably added in an amount of from 10 to 5000 ppm, in particular from 50 to 1000 ppm. As a rule, larger amounts of additive must be introduced into lubricants, and the amounts in this case may be from 0.1 to 6, in particular from 0.5 to 5, % by weight.

If it is intended primarily to utilize the dispersing properties of the novel substances, they can also be combined with conventional detergents as further additives.

In principle, any known product from among the products suitable for this purpose can be used as a detergent component in the mixture with the novel substances as dispersants, as described, for example, in J. Falbe and U. Hasserodt, Katalysatoren, Tenside und Mineralöladditive, G. Thieme Verlag Stuttgart, 1978, page 223 et seq., or in K. Owen, Gasoline and Diesel Fuel Additives, John Wiley & Sons, 1989, page 23 et seq.

N-containing detergents, for example compounds which contain an amino or amido group, are preferably used. Polyisobutylamines according to EP-A 0 244 616, ethylenediaminetetraacetamides and/or ethylenediaminetetraacetimides according to EP-A-0 3 356 725 are particularly suitable, reference being made to the definitions in these publications. As in the case of the novel reaction products, the products described there also have the advantage of being chlorine-free or chloride-free owing to their prepartion.

If it is intended primarily to utilize the detergent action of the novel reaction products, these substances may also be combined with carrier oils. Such carrier oils are known, carrier oils based on polyglycol, for example corresponding ethers and/or esters, as described in U.S. Pat. No. 5,004,478 or DE-A 38 38 918, being particularly suitable. Polyoxyalkylene monools having terminal hydrocarbon groups (U.S. Pat. No. 4,877,416) or carrier oils as disclosed in DE-A 41 42 241 may also be used.

Suitable fuels for gasoline engines are leaded and in particular unleaded regular and premium-grade gasoline. The gasolines may also contain components other than hydrocarbons, for example alcohols, such as methanol, ethanol or tert-butanol, and ethers, eg. methyl tert-butyl ether. In addition to the novel reaction products, the fuels also contain, as a rule, further additives, such as corrosion inhibitors, stabilizers, antioxidants and/or further detergents.

Corrosion inhibitors are generally ammonium salts of organic carboxylic acids, which tend to form films as a result of the starting compounds having an appropriate structure. Amines for reducing the pH are also frequently present in corrosion inhibitors. Heterocyclic aromatics are generally used for preventing corrosion of nonferrous metals.

Testing of the products for suitability as fuel additives was carried out by means of engine tests; keep-clean effect in intake valves (1.2 1 Opel Kadett engine) was tested in testbed tests according to CEC-P-04-A-87.

PREPARATION EXAMPLES

Assignment of the structures I to IV and calculation of the amount by weight of the particular compound I to IV were carried out by means of $^1$H-NMR spectroscopy (measurements in $CDCl_3$, values in ppm):

$CH_2$—$NO_2$ in I: 4.65 (d, 1H); 5.20 (d, 1H); AB system $CH_2$—$NO_2$ in II: 4.35 (d, 1H); 4.50 (d, 1H); AB system $CH_2$—$NO_2$ in III: 5.30 (d, 2H); 5.42 (d, 2H); AB system $CH_2$—$NO_2$ in IV: 4.71–4.74 (s, 4H)

All stated percentages in the examples, with the exception of the E values, are based on weight.

Example 1

In a stirred flask, 722 g of highly reactive polyisobutene (Glissopal® ES 3250) having an average molecular weight of 1017 and an E value of 85% and 787 g of Mihagol® M (n-paraffin mixture, $C_{10}$–$C_{13}$) were mixed. At a heating jacket temperature of 40° C., 85 g (1.85 mol) of nitrogen dioxide were introduced in the course of 3 hours. During this procedure, the internal temperature increased to 43° C. After the excess $NO_2$ had been stripped with nitrogen, 500 g of water were added and stirring was carried out for 2 hours at from 50° to 60° C. The phase separation was then carried out and the organic layer was distilled under reduced pressure to remove residual amounts of water.

1515 g of the reaction solution, which contained about 52% of reaction products, were obtained. Preparative chromatography indicated that conversion was complete. The $^1$H-NMR spectrum gave a product composition of 57% of I, 23% of II, 12% of III and 8% of IV, based on the amount of I to IV.

The elemental analysis of the product solution gave the following result:

81.5% of C; 14.31% of H; 2.7% of O; 1.0% of N.

Example 2

When the procedure in Example 1 was followed but the reaction mixture was not treated with water but was heated for 1 hour at 40°–50° C. at 1 mbar, 1537 g of reaction solution having the following elemental analysis were obtained:

81.8% of C; 13.4% of H; 2.7% of O; 1.1% of N.

The roughly 50% of reaction products in the reaction solution had the following composition according to the $^1$H-NMR spectrum: 58% of I, 22% of II, 12% of III and 8% of IV, based on the amount of I to IV.

Example 3

When the procedure in Example 2 was followed but 2.6 g of water were added to the reaction batch, heating under reduced pressure gave 1564 g of reaction solution having the following elemental analysis:

81.8% of C; 14.2% of H; 2.7% of O; 1.5% of N.

According to the $^1$H-NMR analysis, the reaction product had the following composition: 55% of I, 24% of II, 13% of III and 8% of IV, based on the amount of I to IV.

Example 4

200 g of the highly reactive polyisobutene from Example 1 and 225 g of tert-butyl methyl ether were treated with 30 g of nitrogen dioxide in a stirred apparatus at 60° C. in the course of 2 hours. The mixture was cooled, after which excess $NO_2$ was expelled with nitrogen and the reaction solution was stirred with 120 g of water for 3 hours at 60° C. After the phase separation, the solvent was distilled off from the organic phase under reduced pressure. 218 g of reaction product having the following elemental analysis remained: 79.1% of C; 13.0% of H; 5.2% of O; 2.1% of N.

The $^1$H-NMR spectrum had the following composition: 59% of I, 22% of II, 12% of III and 7% of IV, based on the amount of I to IV.

Example 5

The procedure was as in Example 4, but the nitrogen dioxide was passed in at from −8° to −5° C. 215 g of product were obtained.

The $^1$H-NMR spectrum gave the following composition: 52% of I, 21% of II, 18% of III and 9% of IV, based on the amount of I to IV.

Example 6

200 g of the highly reactive polyisobutene from Example 1 and 225 g of tert-butyl methyl ether were treated with 17.1 g of nitric oxide with which air was admixed in a volume ratio of 1:1, in a stirred apparatus at 0° C. in the course of 2 hours. After stirring had been carried out for a further 3 hours at 20° C., 150 g of water were added to the mixture and heating was effected for 3 hours at from 50° to 60° C. Thereafter, the mixture was cooled, phase separation was carried out and the solvent was distilled off from the organic phase. The resulting 218 g of residue contained, according to $^1$H-NMR, 42% of I, 10% of II, 8% of III and 4% of IV, based on the total amount of the residue.

Example 7

(for comparison)

In a stirred flask, 720 g of polyisobutene containing only a small proportion of terminal double bonds (Indopol® H 100, average molecular weight 930, bromine number 22.4, E=10%) and 820 g of Mihagol® M (n-paraffin mixture, $C_{10}$–$C_{13}$) were stirred and were treated with 115 g of nitrogen dioxide at 40° C. in the course of 4 hours. After the excess nitrogen dioxide had been stripped with nitrogen, 350 g of water were added to the reaction product and stirring was carried out for 3 hours at 60° C. After phase separation, stirring was carried out again with water and the organic phase was then distilled briefly under reduced pressure. 1570 g of product were obtained as a clear solution. A conversion of 94%, based on the polyisobutene used, was determined by means of preparative chromatography.

The elemental analysis gave the following result: 81% of C; 14.1% of H; 3.0% of O; 1.21% of N.

When the reaction was carried out in tert-butyl methyl ether and the solvent was distilled off after the working up, the solvent-free product gave the following analysis: 80.0% of C; 13.4% of H; 4.7% of O; 2% of N.

The $^1$H-NMR spectra gave an unstructured multiplet at from 4.2 to 5.4 ppm, which could not be assigned to any defined structures.

Example 8

400 g of reaction solution from Example 4 were stirred, before evaporation of the solvent, tert-butyl methyl ether, with 600 g of water and 20 g of sodium carbonate for 20 hours at 25° C. In order to achieve better phase separation, 140 g of 10% strength hydrochloric acid were added to the reaction mixture and the organic upper phase was then separated off and evaporated down.

197 g of reaction product giving the following elemental analysis remained: 81.6% of C; 13.5% of H; 3.3% of O; 1.3% of N.

The $^1$H-NMR spectrum showed, in addition to residues of compound II, mainly compound XVII in the cis and trans form, detectable from 2 singulets at 6.9 and 7 ppm.

Use examples
Keep-clean test in intake valves

The engine tests were carried out using an Opel Kadett 1.2 l engine (according to CEC-F-04-A-87).

Fuel used: European unleaded premium grade
Metering of the additive: 200 ppm in each case

| Example No. | Additive from Example No. | Intake valve deposits [mg] *) | | | |
|---|---|---|---|---|---|
| | | Valve 1 | Valve 2 | Valve 3 | Valve 4 |
| 9 | 4 | 4 (210) | 0 (150) | 0 (154) | 1 (200) |
| 10 | 1 | 3 (277) | 3 (175) | 6 (183) | 5 (337) |
| 11 | 2 | 1 (277) | 1 (175) | 0 (183) | 3 (337) |

*) values without additive (blank test) in brackets

The results clearly show the valve-cleaning action of the novel additives.

We claim:

1. A reaction product of a polyisobutene having an average degree of polymerization P of from 10 to 100 and a content E of from 60 to 90% of double bonds which can react with maleic anhydride, E=100% corresponding to the theoretical value for the case where each molecule of the polyisobutene has such a reactive double bond, with oxides of nitrogen or mixtures of oxides of nitrogen and oxygen.

2. A reaction product of a polyisobutene and oxides of nitrogen or mixtures of oxides of nitrogen and oxygen as claimed in claim 1, the polyisobutene containing up to 20% by weight of $C_4$ monomers other than isobutene or $C_3$ monomers or ethylene as polymer-forming units.

3. A reaction product of a polyisobutene and oxides of nitrogen or mixtures of oxides of nitrogen and oxygen as claimed in claim 1 in the form of a mixture of different nitro-containing alkanes, this mixture containing, as main components, the compounds of the formulae I and II $$H_3C-\underset{\underset{CH_3}{|}}{\overset{\overset{CH_3}{|}}{C}}-\left(CH_2-\underset{\underset{CH_3}{|}}{\overset{\overset{CH_3}{|}}{C}}\right)_{P-2}-CH_2-\underset{\underset{CH_3}{|}}{\overset{\overset{NO_2}{|}}{C}}-CH_2-NO_2 \quad (I)$$

$$H_3C-\underset{\underset{CH_3}{|}}{\overset{\overset{CH_3}{|}}{C}}-\left(CH_2-\underset{\underset{CH_3}{|}}{\overset{\overset{CH_3}{|}}{C}}\right)_{P-2}-CH_2-\underset{\underset{CH_3}{|}}{\overset{\overset{OH}{|}}{C}}-CH_2-NO_2 \quad (II)$$

having the degree of polymerization P mentioned in claim 1.

4. A process for the preparation of a reaction product of a polyisobutene having an average degree of polymerization P of from 10 to 100 and a content E of from 60 to 90% of double bonds which can react with maleic anhydride, E=100% corresponding to the theoretical value for the case where each molecule of the polyisobutene has such a reactive double bond, with oxides of nitrogen or mixtures of oxides of nitrogen and oxygen, comprising reacting the polyisobutene described with the oxides of nitrogen in a molar ratio of from 1:2 to 1:4 at from −30° to 150° C.

5. A reaction product of a polyisobutene and oxides of nitrogen or mixtures of oxides of nitrogen and oxygen as claimed in claim 1, which, after its formation, has been converted by elimination with bases into nitro-containing alkenes.

6. A reaction product of a polyisobutene and oxides of nitrogen or mixtures of oxides of nitrogen and oxygen as claimed in claim 1, which, after its formation, has been converted by elimination with bases into nitro-containing alkenes, which mainly have the structures XVI and/or XVIII $$R-CH_2-\underset{\underset{CH_3}{|}}{C}=CH-NO_2 \quad (XVII)$$

$$R-\overset{\overset{NO_2}{|}}{C}=\underset{\underset{CH_3}{|}}{C}-CH_3 \quad (XVIII)$$

where R is polyisobutyl of the formula $$H_3C-\underset{\underset{CH_3}{|}}{\overset{\overset{CH_3}{|}}{C}}-\left(CH_2-\underset{\underset{CH_3}{|}}{\overset{\overset{CH_3}{|}}{C}}\right)_{P-2}$$

having the degree of polymerization P mentioned in claim 1.

7. A process for the preparation of a nitro-containing alkene, which comprises subjecting a reaction product of a polyisobutene and oxides of nitrogen or mixtures of oxides of nitrogen and oxygen as claimed in claim 1 after its formation to elimination with bases.

8. A reaction product of a polyisobutene and oxides of nitrogen or mixtures of oxides of nitrogen and oxygen as claimed in claim 1, which, after its formation, has been converted by hydrogenation into aminoalkanes.

9. A reaction product of a polyisobutene and oxides of nitrogen or mixtures of oxides of nitrogen and oxygen as claimed in claim 1, which, after its formation, has been converted by hydrogenation mainly into one or more aminoalkanes of the structures XIX to XXVI $$R-CH_2-\underset{\underset{CH_3}{|}}{\overset{\overset{NH_2}{|}}{C}}-CH_2-NH_2 \quad (XIX)$$

$$R-CH_2-\underset{\underset{CH_3}{|}}{\overset{\overset{OH}{|}}{C}}-CH_2-NH_2 \quad (XX)$$

$$R-CH_2-\underset{\underset{CH_2-NH_2}{|}}{\overset{\overset{NH_2}{|}}{C}}-CH_2-NH_2 \quad (XXI)$$

$$R-CH_2-\underset{\underset{CH_2-NH_2}{|}}{\overset{\overset{OH}{|}}{C}}-CH_2-NH_2 \quad (XXII)$$

-continued

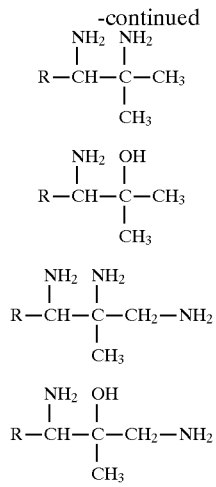

(XXIII)
(XXIV)
(XXV)
(XXVI)

where R is polyisobutyl of the formula

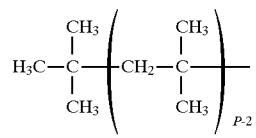

having the degree of polymerization P mentioned in claim 1.

10. A reaction product of a polyisobutene and oxides of nitrogen or mixtures of oxides of nitrogen and oxygen as claimed in claim 1, which, after its formation, has been converted by elimination with bases into nitro-containing alkenes, and then by hydrogenation into aminoalkanes.

11. A reaction product of a polyisobutene and oxides of nitrogen or mixtures of oxides of nitrogen and oxygen as claimed in claim 1, which, after its formations has been converted by elimination with bases into nitro-containing alkenes, and then by hydrogenation mainly into aminoalkanes of the structures XXVII and/or XXVIII

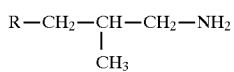 (XXVII)

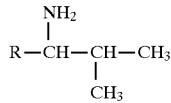 (XXVIII)

where R is polyisobutyl of the formula

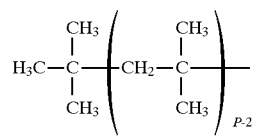

having the degree of polymerization P mentioned in claim 1.

12. A reaction product of a polyisobutene and oxides of nitrogen or mixtures of oxides of nitrogen and oxygen as claimed in claim 1, which, after its formation, has been converted by elimination with bases into nitro-containing alkenes and then by addition of amines or alcohols and subsequent hydrogenation or by cleavage to aldehydes and addition of amines onto these aldehydes and subsequent hydrogenation into aminoalkanes.

13. A reaction product of a polyisobutene and oxides of nitrogen or mixtures of oxides of nitrogen and oxygen as claimed in claim 1, which, after its formation, has been converted by elimination with bases into nitro-containing alkenes and then by addition of amines of the formula $HNR^1R^2$ or alcohols of the formula $R^1$—OH and subsequent hydrogenation or by cleavage to aldehydes and addition of amines of the formula $HNR^1R^2$ onto these aldehydes and subsequent hydrogenation into aminoalkanes, which mainly have one or more of the structures XXIX to XXXIV

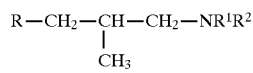 (XXIX)

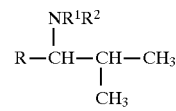 (XXX)

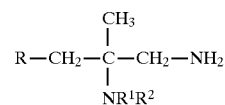 (XXXI)

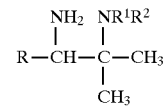 (XXXII)

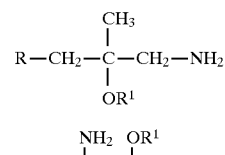 (XXXIII)

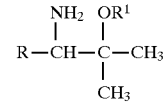 (XXXIV)

where R is polyisobutyl of the formula

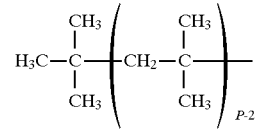

having the degree of polymerization P mentioned in claim 1, and $R^1$ and $R^2$ are $C_1$–$C_{30}$-alkyl, $C_2$–$C_{30}$-alkenyl, $C_5$–$C_8$-cycloalkyl, $C_7$–$C_{18}$-aralkyl or unsubstituted or substituted $C_6$–$C_{14}$-aryl, and $R^2$ may furthermore be hydrogen.

14. A fuel for gasoline engines, comprising a fuel and a dispersant or detergent effective amount of a reaction product of a polyisobutene and oxides of nitrogen or mixtures of oxides of nitrogen and oxygen as claimed in claim 1, 2, 3, 5, 6, 8, 9, 10, 11, 12 or 13.

* * * * *